United States Patent [19]

Ohtsuka et al.

[11] Patent Number: 4,906,444

[45] Date of Patent: Mar. 6, 1990

[54] METHOD OF MANUFACTURING CALCIUM PHOSPHATE USING PHOSPHORUS IN PLANTS

[76] Inventors: Torao Ohtsuka, 4-9 Fujiyamadai 5-chome, Kasugai-shi, Aichi-ken; Makoto Fukaya, 515 Omoteyama 2-chome, Tenpaku-ku, Nagoya-shi, Aichi-ken; Hideo Tagai, 24-31 Den.enchofu 2-chome, Ohta-ku, Tokyo, all of Japan

[21] Appl. No.: 307,828

[22] Filed: Feb. 7, 1989

[30] Foreign Application Priority Data

Apr. 28, 1988 [JP] Japan .................. 63-106950

[51] Int. Cl.$^4$ ................ C01B 15/16; C01B 25/26
[52] U.S. Cl. .................... 423/308; 423/311
[58] Field of Search .................. 423/308, 311

[56] References Cited

U.S. PATENT DOCUMENTS

| | | | |
|---|---|---|---|
| 3,737,516 | 6/1973 | Jenner ............... | 423/308 |
| 4,448,758 | 5/1984 | Nagai et al. ........ | 423/308 |
| 4,497,075 | 2/1985 | Niwa et al. ......... | 423/308 |
| 4,794,171 | 12/1988 | Tagaya et al. ...... | 423/308 |
| 4,836,994 | 6/1989 | Inoue et al. ........ | 423/308 |

FOREIGN PATENT DOCUMENTS 167114 12/1980 Japan .................. 423/308
223209 12/1984 Japan .

Primary Examiner—John Doll
Assistant Examiner—Wayne A. Langel
Attorney, Agent, or Firm—Rosen, Dainow & Jacobs

[57] ABSTRACT

A method of manufacturing calcium phosphate using phosphorus in plants. The method comprising the steps of firstly slurrying raw material containing phosphorus, including plants particularly such as soybean, corn, oil meal of the rice bran and the like; adding one or more selected among oxide, hydroxide and carbonate of calcium to the slurry and mixing them; controlling Mg component derived from the raw material so that the Mg/Ca mole ratio is in the range of 0.25 or less; dehydrating and drying them; controlling pH of the slurry and 7.5 or higher and slowly heating them within the temperature range from 150° C. to 650° C. in the oxidation atmosphere to dissipate and remove carbon; and finally raising the temperature to burn them within the temperature range from 700° C. to 1550° C. in the oxidation atmosphere.

2 Claims, 4 Drawing Sheets

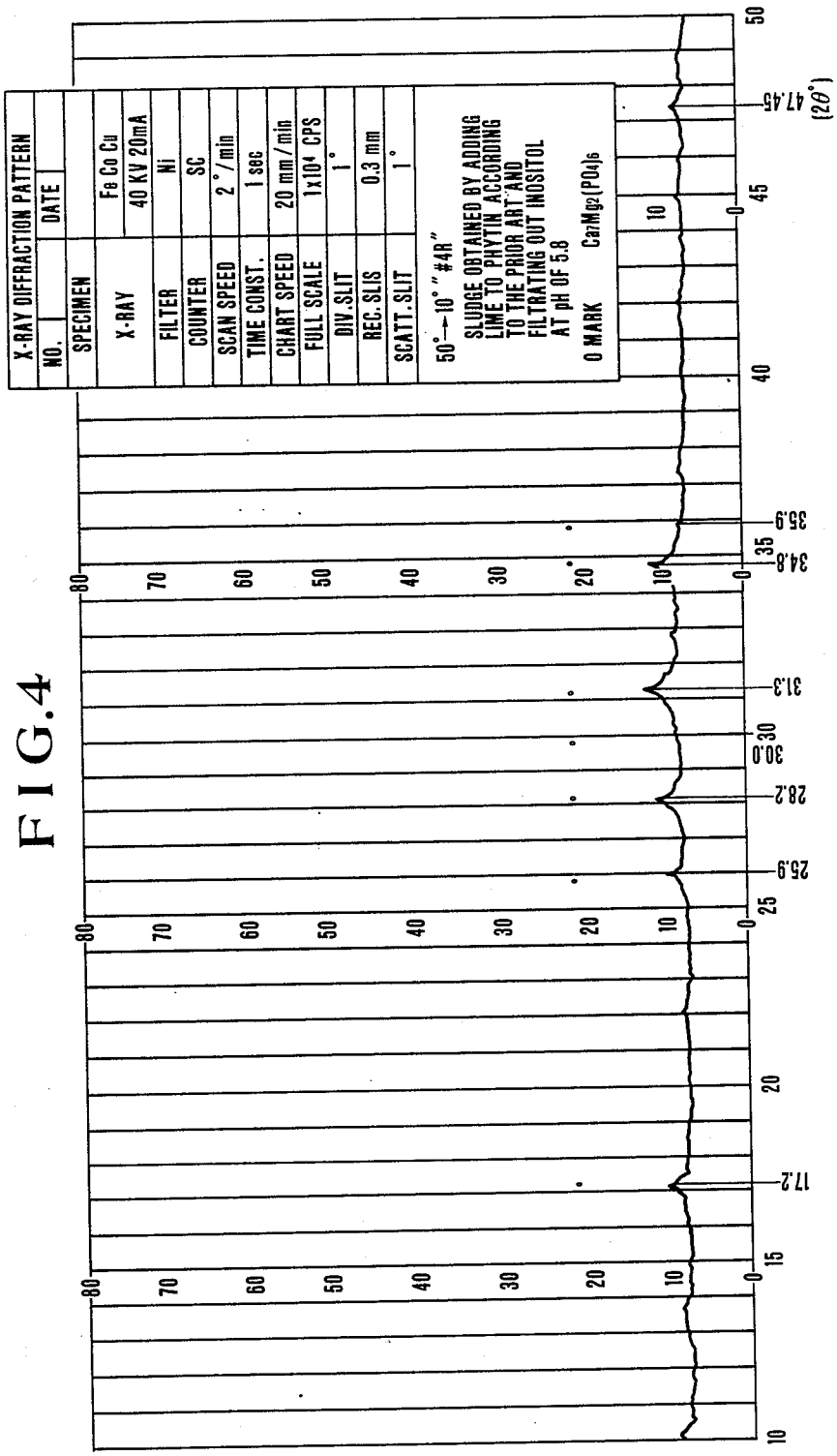

METHOD OF MANUFACTURING CALCIUM PHOSPHATE USING PHOSPHORUS IN PLANTS

BACKGROUND OF THE INVENTION

1. Field of the Invention

The present invention relates to a method of manufacturing calcium phosphates in which compositions containing phosphorus such as particularly phytin in the plants are used as a supply source of phosphorus, more particularly to such a method of providing a market with a product that is fully superior in quality and remarkably lower in price as compared with that of the prior art.

2. Description of the Prior Art (a) As a manufacturing method of calcium phosphates well known hitherto, there is a method which firstly starts from inorganic materials, for example, inorganic rock phosphate such as inorganic materials such as apatite, ash phosphate, guano ore and the like. Phosphoric acid is manufactured from these materials. Then lime is added to the phosphoric acid to synthesize calcium phosphate. The disadvantage of this method will be discussed later.

(b) As another method of the prior art, there is a method which treats the bones of animals with acid and hot water to remove gelatin thereby obtaining phosphoric acid lime especially such as the mixture of natural hydroxylapatite $Ca_{10}(PO_4)_6 \cdot (OH)_2$ and orthophosphoric acid. Further, there is a method of obtaining synthetic calcium phosphate by chemically collecting phosphorus component that is lost in the process of removing gelatin. The disadvantages of these methods will also be discussed later.

(c) As a relatively new prior art, there is a manufacturing method as disclosed in the Patent Public Disclosure No. 223,209/1984 Official Gazette (entitled "Manufacturing method of calcium phosphate for the porcelain and the porcelain of calcium phosphate system"). The gist of this manufacturing method described in the claim of the specification of the publication is as follows: In this method, carbonate of alkaline earth method is added to phytin which is separated from the rice bran. The carbonate may not be added. Then hydrolysis is executed at the temperature over 100° C. under pressure. Thereafter, pH is regulated in the range between 5 and 8. Then the resultants is filtrated to obtain calcium phosphate. As discussed hereinbefore, this method can be divided roughly into two categories, that is, one category in which carbonate of alkaline earth metal is added and the other category in which carbonate is not added. Furthermore, since the contents of this method varies extremely according to the fact that carbonate of alkaline earth metal is Ca salt or Mg salt. Thus this method is still discriminated into two categories and therefore it is divided into three categories. The disadvantages of this method will be discussed hereinafter.

Now the disadvantages of the aforementioned manufacturing methods are discussed. In the prior art (a), natural rock phosphates are used as raw material and are limited resources which are going to be exhausted year by year in the whole world. Accordingly there is a tendency to raise their cost on the whole. Thus such resources will not be expected too much as raw material in the near future. Particularly, there has been arisen such a serious problem that the supply of such raw material is unstable in many countries since it is almost dependent upon the import.

Furthermore, since fluorine, uranium and rare earth elements are contained in apatite, the difficult operations are required to remove them. Accordingly the manufacturing cost become extremely expensive. The increasing rise of price of calcium phosphates is inevitable by reason of exhaustion of the resources. In this regard, it is as high in cost as ¥270,000 or higher per ton even at present.

Since the calcium phosphates are synthetic products and therefore their quality are very solid, it is considerably difficult to treat them for use. Accordingly there is a such problem that the range of its use as the material for organism and the like are limited due to their quality.

As to the prior art (b), natural bones of animals are used as the raw material and therefore their supply amount are restricted due to the natural product. Thus the price thereof become extremely high as almost ¥300,000 or higher per ton. As a result, there is a such problem that it is difficult to use it as general industrial materials.

Furthermore, since the qualities of the bones of the animals differ from each other according to the breeding and life of each animal, there is a such problem that it is difficult to obtain calcium phosphate with uniform quality.

Moreover, the method of manufacturing synthetic calcium phosphate by collecting the phosphorus components which depart from in the gelatin removing process has a such problem that the melting point of the calcium phosphate become lower and therefore its uses are limited within a narrow range.

Additionally, it has such a disadvantage that odor generation is enormous in the process of obtaining calcium phosphate from the resource of the animals, thereby causing air pollution.

Concerning the prior art (c), according to the claims of the specification of the Patent Public Disclosure No.223,209/1984 Official Gazette, such method as to add calcium carbonate among carbonates of alkaline earth metal to phytin separated from the rice bran is carried out as follows: the hydrolysis is made at a temperature over 100° C. Then pH of the liquid is regulated in the range between 5 and 8 to cause the precipitations of calcium hydrogenphosphate. They are filtered to provide as the filtrate the inositol solution for another use (raw materials for the seasonings etc.) and to provide as the precipitation calcium phosphate. However, since calcium phosphate is produced in the acid solution according to the embodiments, calcium phosphate has, for example, Mg derived from the rice bran at pH of 5.8 and tends to become $Ca_7Mg_2(PO_4)_6$. Further, a large quantity of H+ radicals exist in the composition. Thus the basis containing much H+radicals is unstable in component and accordingly the melting point of the calcium phosphate goes down. Thus it does not enough in strength and thermal resistance even after it is purified and kneaded to be shaped and baked. There is such a problem that it does not have sufficient quality as the raw material for the porcelain. Further, there are such problems that it is not adequate for the porcelain material such as so-called bone china and the like as it is since calcium phosphate formed in the acid solution contains a lot of brushite $CaHPO_4 \cdot 2H_2O$ and monetite $CaHPO_4$. Additionally, it may not be used as the material of the organism of the recent new ceramics since the property of it is totally different from that of hydroxylapatite $Ca_{10}(PO_4)_6(OH)_2$.

Besides, in this prior art (c) the plants are used as the raw material so that calcium phosphate contains a lot of carbohydrate. However, there is no operation to remove carbons in this manufacturing method and therefore has the following defects: If the porcelain is burned in an ordinary manner using calcium phosphate produced by this method, carbons are fixed and liberated so that the product of the porcelain become black and cannot be colored freely.

Then, in case of adding magnesium carbonate, talc and the like among carbonates of the alkaline earth metals to phytin separated from the rice bran, there is such a disadvantage that the use of the glazes is limited because Mg is further added to the natural $Ca_7Mg_2(PO_4)_6$ to lower the melting point of the product.

Furthermore, in the method of adding no carbonate of the alkaline earth metal in the prior art (c), since there are little Ca source or Mg source, phosphoric acid is formed; however calcium phosphate and magnesium phosphate are not formed at all even by pressure superheating in the autoclave. Otherwise a very small amount of them may be formed. As a result, inositol is mainly formed by this method. Accordingly, this prior art is also highly unsatisfactory as the method of manufacturing calcium phosphate.

As discussed hereinbefore, this prior art (c) may be excellent as compared with the other prior arts from the viewpoint of finding the rice bran as the resource of phosphoric acid. However it can not contribute to actually produce calcium phosphate used for the raw material for the porcelain and the material used in the organism in the respect of the contents of the concrete technique. It will be understood that this seems to be an unfinished invention and therefore it is clear that even if such conception is obtained by those technical experts and researchers it could not be easily realized to them to complete the embodied method of manufacturing excellent calcium phosphate in practice.

SUMMARY OF THE INVENTION

It is an object of the present invention to provide a concrete method of manufacturing excellent calcium phosphate in order to overcome the problems and the disadvantages of the prior art, by which the raw material can be stably supplied. The raw material is insoluble in water and can be used for the high-grade porcelain as well as in the high-technique fields such as the organism fields.

The features of the method of manufacturing calcium phosphate of the present invention are realized by firstly slurrying the material containing phosphorus such as the plants to obtain slurry, in particular, soybean, corn, oil meal of the rice bran and the like, by adding and mixing one or more of oxide, hydroxide and carbonate of calcium to the slurry, by controlling Mg component derived from the material so that Mg/Ca mole ratio is in the range of 0.25 or less, by controlling pH value of the slurry at 7.5 or more, then by slowly heating within a temperature range from 150° C. to 650° C. in the oxidation atmosphere thereby scattering and removing carbon after dehydrating and drying, and by raising the temperature to burn them within a temperature range from 700° C. to 1550° C. in the oxidation atmosphere.

Now the constructions of the present invention will be explained more concretely and in detail hereinafter.

The plants, in particular, grains are the source of the raw material and therefore everything which includes phosphorus, for example, soybean, corn, oil meal of the rice bran and the like are usable. Especially, it is desirable that they become to contain phytin when slurried.

And the components are calculated so as to control the Mg/Ca mole ratio at 0.25 or less by adding the Ca component to the slurry. The reason why the mole ratio is limited to 0.25 and less is that, if the ratio is over 0.25, the melting point of the product of calcium phosphate becomes too low to use as the material source for the high-grade porcelain or the material for the new ceramics and accordingly the usages of it are limited to the glaze and the like.

In the manufacturing method of the present invention, phosphorus exists mainly as phytin upon hydrolysis occurred when the materials of the plants including phosphorus ar slurried. Calcium phosphate is formed, in accordance with the following reaction, by adding calcium component to such phytin and keeping pH value 7.5 or higher.

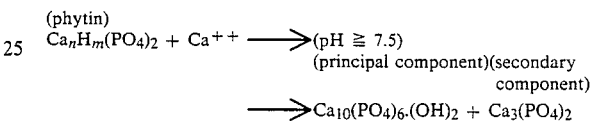

Where $n=1\sim3$, $m=1\sim2$. When a small amount of Ca, Mg are contained in phytin, there may arise some instances where the substance given by the following formula is produced.

$$(C_6H_6P_6O_{27})\cdot Ca_5Mg$$

Accordingly, if this Mg is too much, the melting point is excessively lowered and therefore Ca component is required to be added so as to control the Mg/Ca mole ratio at 0.25 or smaller.

The operations described hereinbefore of the present invention are extremely different from that of the above discussed prior art (c). Namely, in the prior art (c), pH value is controlled in the range of 5~8 including pH of, for example, about 5.8. In this case of pH 5.8, phosphate of $Ca_7Mg_2(PO_4)_6$ is mainly formed as well as brushite, monetite and the like. As mentioned above, these materials contain H atoms in the molecular structure. Accordingly, the organization of calcium phosphate formed by this prior art (c) is unstable so that the shapes of the products are also unstable since these materials are also soluble in water. In contrast, since both $Ca_{10}(PO_4)_6\cdot(OH)_2$ and $Ca_3(PO_4)_2$ produced according to the present invention have not independent H atom, they are insoluble in water so that the molecular structure and the shape are stable and therefore such effects totally differ from those of said prior arts.

Then, in the present invention, calcium phosphate formed as mentioned above is dehydrated and dried and thereafter slowly heated within a temperature range from 150° C. to 650° C. in the oxidation atmosphere. Accordingly carbohydrate naturally contained in the leaves of the plants are dehydrated and scattered as carbon dioxide or carbon monoxide so as to be prevented from fixing. As to this respect, the prior art (c) does not contain the decarbonizing process so that carbohydrate remains in the product of calcium phosphate and accordingly the effects of the present invention is wholly different from the above effects of the prior art (c).

BRIEF DESCRIPTION OF THE DRAWINGS

For the purpose of illustrating the present invention, there is shown in the accompanying drawing one form of which is presently preferred, it being understood that the present invention is not intended to be limited to the precise arrangements shown therein.

FIG. 4 is a X-ray diffraction pattern of a sample obtained according to the prior art (c).

DESCRIPTION OF THE PREFERRED EMBODIMENT

The embodiment of the present invention will be discussed hereinafter in comparison with the prior art (c) as to the important points.

At first, remaining leaves which were obtained by pressing out the oil from the plants, particularly the grains, are slurryed. Then they were heated to execute the hydrolysis process if necessary. Then the lime were added as $Ca(OH)_2$ to them by a necessary amount, and then pH of them was controlled to 7.8 in the embodiment of the present invention while to 5.8 in the embodiment of of the prior art (c). Specific gravity, analysis values, and Ca/P mole ratio and Mg/Ca mole ratio of dried samples obtained according these embodiments are as shown in Table 1.

TABLE 1

| sample | | embodiment of the invention | embodiment of prior art (c) |
|---|---|---|---|
| pH | | 7.8 | 5.8 |
| specific gravity | | 2.88 | 2.83 |
| | | [Wt %] | [Wt %] |
| analysis values | Ig.loss | 12.84 | 9.66 |
| | $SiO_2$ | 0.42 | 0.53 |
| | $Al_2O_3$ | 0.16 | 0.20 |
| | $Fe_2O_3$ (T.I) | 0.05 | 0.05 |
| | CaO | 45.25 | 36.80 |
| | MgO | 7.02 | 8.95 |
| | $K_2O$ | 0.38 | 0.48 |
| | $Na_2O$ | 0.14 | 0.18 |
| | $P_2O_5$ | 33.80 | 43.10 |
| | total | 100.06 | 99.95 |
| mole ratio | Ca/P | 1.69 | 1.09 |
| | Mg/Ca | 0.22 | 0.37 |

Where T.I. means Total Iron in Table 1.

Then, the sample of the embodiment of the present invention was dehydrated and dried at 105° C. and then was slowly heated to raise the temperature at a rate of 100° C. per hour from 150° C. to 650° C. in the oxidation atmosphere to thus dissipate carbon in the sample as carbon dioxide or carbon monoxide. After this, the temperature of it was raised at a rate of about 70° C. per hour. It was burned temperature range from 700° C. to 1550° C. in the oxidation atmosphere and then is cooled.

It is to be noted that the sample of the prior art (c) was prepared in accordance with the method described in the claims of Patent Public Disclosure No.223,209/1984 Official Gazette.

Figure 1:
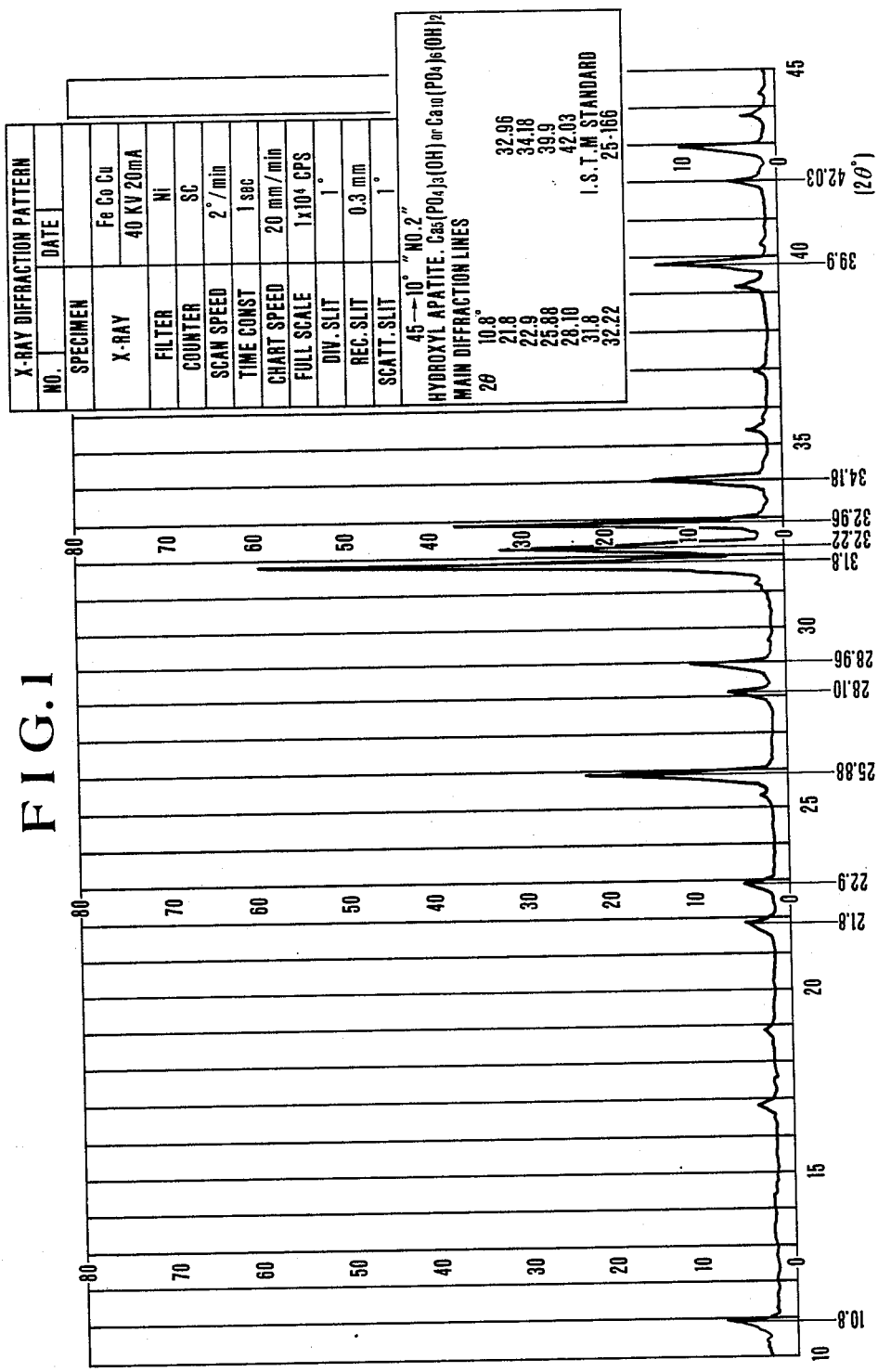
FIG. 1 is a X-ray diffraction pattern of a sample obtained by a method according to an embodiment of the present invention.

Then, these samples were powdered to measure their respective refractive angles by an X-ray diffraction apparatus thereby accomplishing identification of produced minerals. The results are shown in FIGS. 1 to 4 as the X-ray diffraction patterns. FIG. 1 shows the X-ray diffraction pattern of the sample of the embodiment of the present invention, in which the main peaks of the strength of refractive angle are found at the angle $2\theta = 10.8, 25.9, 31.8, 32.2, 32.9, 34.2$ and $39.9$. Comparing this result with the X-ray diffraction patterns of the synthetic bone ash in the prior art of FIG. 2, the natural cattle bone in the prior art of FIG. 3 and the samples in the prior art (c) of FIG. 4, it is known that the resultant of the manufacturing method of the present invention is very close to the natural cattle bone since the peaks nearly correspond with those of strength of the cattle bone at the angle of 10.8, 25.9, 31.8, 32.2, 32.9, 34.2 and 39.9. As known from the past, the natural cattle bone contains so-called hydroxylapatite $Ca_{10}(PO_4)_6 \cdot (OH)_2$, as its principle component, and therefore which is calcium phosphate insoluble in water and chemically stable.

Figure 2:
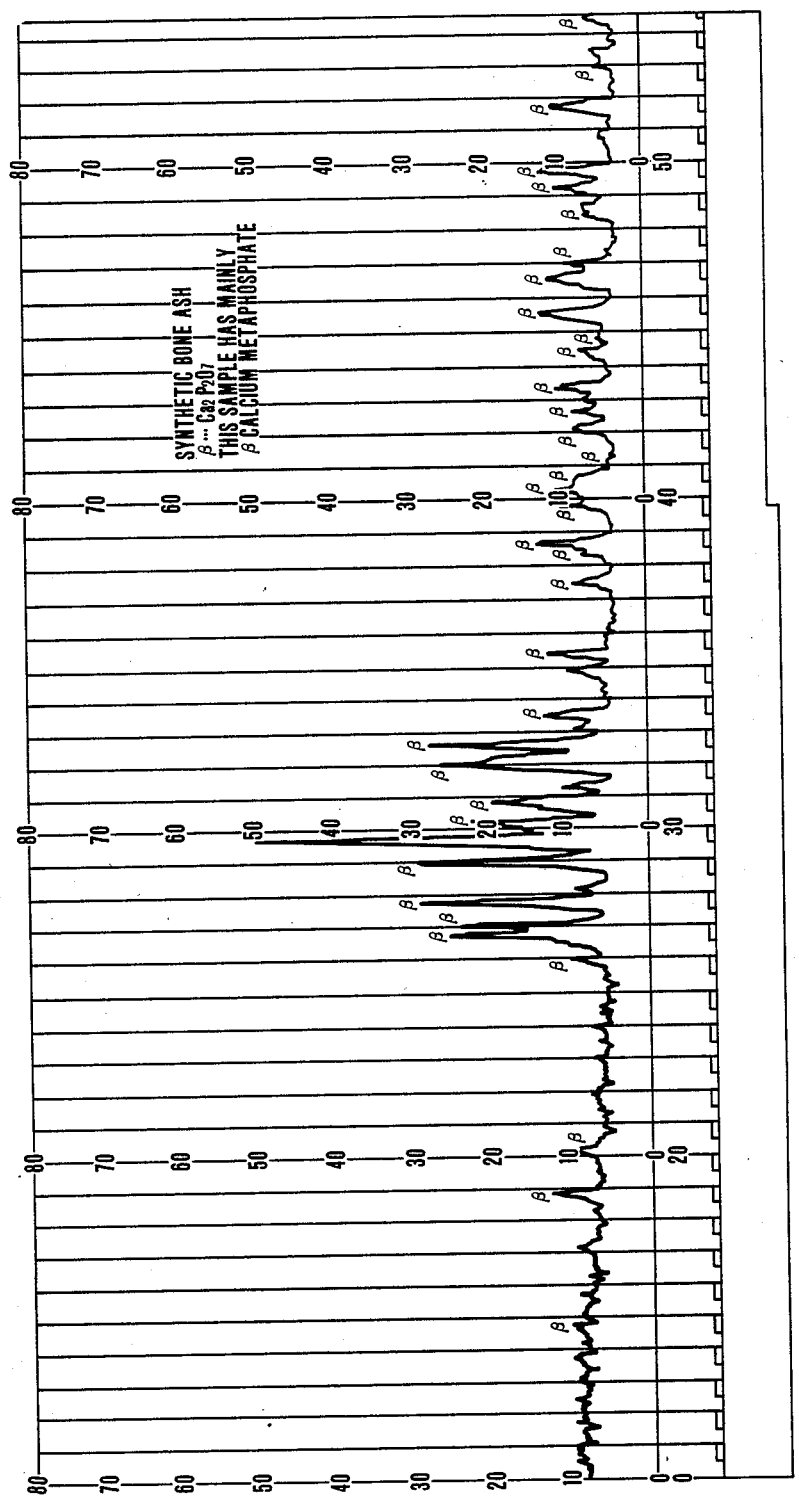
FIG. 2 is a X-ray diffraction pattern of a sample obtained according to the prior art (a)
Figure 3:
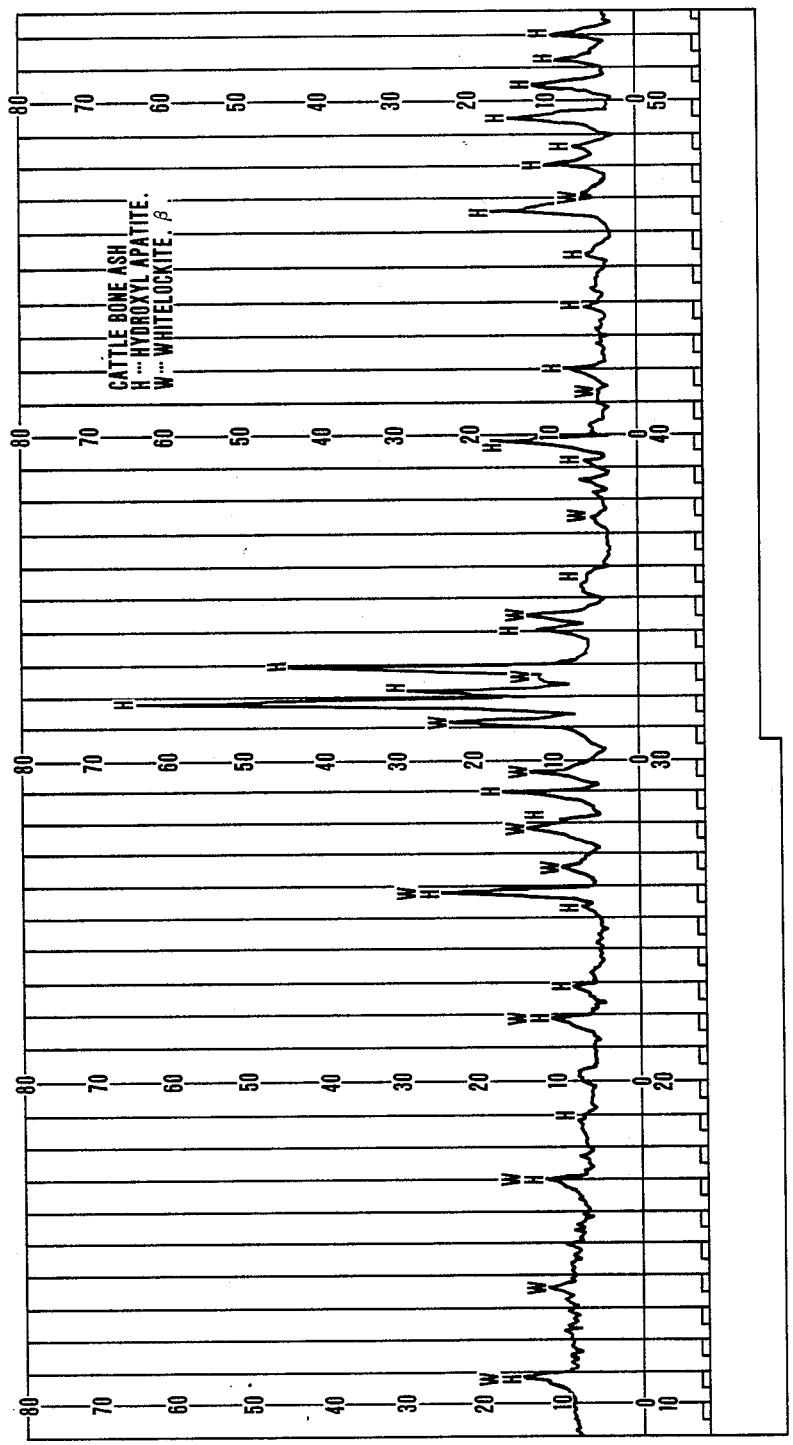
FIG. 3 is a X-ray diffraction pattern of a sample obtained according to the prior art (b)

On the other hand, the sample of the embodiment of the prior art (a) in FIG. 2 has mainly β calcium metaphosphate since the peaks are recognized at the angle $2\theta = 17.2, 26.9, 27.7$ and $29.6$. Accordingly the sample does not seem to be similar to the natural cattle bone. Further, in the X-ray pattern of the sample of the embodiment of the prior art (c) in FIG. 4, the sample seems to be totally different from the cattle bone since there are the peaks at the angle $2\theta = 17.2, 25.9, 28.2, 31.3, 34.8$ and the like.

Furthermore, the bases of the porcelain were made of both the above mentioned sample of the embodiment of present invention and the sample of the embodiment of the prior art (c) and then kneaded and shaped. Thereafter they were burned in a range between 1100° C. and 1200° C. in an ordinary manner. As a result, the product of the present invention was baked nearly white whereas the product of the prior art (c) is baked dark gray. It seems that the reason why such diffrences are caused is that the manufacturing method of the present invention includes the decarbonizing process while the prior art (c) does not have such process.

The meritorious effects obtained by the present invention are as follows.

(1) It was confirmed by the experiments that calcium phosphate made by the manufacturing method of the present invention has a molecular construction similar to the natural cattle bone and contains mainly hydroxylapatite so that the product of the present invention is suited in quality for the material of the high-grade porcelain as well as the material used in the organism and other materials for so-called high-technology ceramics products.

(2) Calcium phosphate obtained by the method of the prior art (c) which is close to the manufacturing method of the present invention among the various prior arts is still far from hydroxylapatite in quality and thus seems to be an incomplete product. Accordingly it becomes clear in the process of accomplishing the present invention that the product of the present invention is superior in quality over that of the prior art (c).

(3) Since the manufacturing method of the present invention is arranged such that phosphate compound is produced from waste of food industry utilizing the plants, the present invention can provide, to the material fields for the hi-technology ceramics industry, very important meritorious effect in which hydroxylapatite, for example, can be manufactured in such an extremely low cost as about half of that in the prior arts.

The invention being best described, it will be obvious that the same way be varied in many ways. Such variations are not to be regarded as a departure from the spirit and scope of the invention and all such modification as would be obvious to one skilled in the art are intended to be included in the scope of the following claims.

What is claimed is:

1. A method of manufacturing calcium phosphate using phosphorus in plants, said method comprising the steps of:

adding at least one substance selected from the group consisting of oxide, hydroxide and carbonate of calcium to a slurry which is obtained by hydrolysis of material containing phosphorus in plants, mixing said substance and said slurry;

controlling Mg/Ca mole ratio of said slurry containing said substance in a range of 0.25 or less and pH value of said slurry at a value of 7.5 or higher;

dehydrating and drying said slurry containing said substance to obtain a dehydrate;

raising temperature of said dehydrate in an oxidation atmosphere by slowly heating it within a temperature range from 150° C. to 650° C., preventing it from fixation of carbon in said material; and burning said dehydrate in a temperature range from 700° C. to 1550° C. in the oxidation atmosphere.

2. A method as claimed in claim 1, wherein said slurry containing phosphorus in said plants contains phytin.

* * * * *